(12) United States Patent
Lundquist et al.

(10) Patent No.: US 7,050,469 B1
(45) Date of Patent: May 23, 2006

(54) GENERATION OF OPTICAL FILAMENTS BY USE OF PHASE PLATE

(75) Inventors: Paul B. Lundquist, Tucson, AZ (US); Stephen William McCahon, Tucson, AZ (US)

(73) Assignee: Ionatron, Tucson, AZ (US)

( * ) Notice: Subject to any disclaimer, the term of this patent is extended or adjusted under 35 U.S.C. 154(b) by 111 days.

(21) Appl. No.: 10/640,304

(22) Filed: Aug. 14, 2003

(51) Int. Cl.
*H01S 3/10* (2006.01)

(52) U.S. Cl. .............................. 372/9; 372/23; 372/109

(58) Field of Classification Search ........... 372/29.023, 372/23, 9
See application file for complete search history.

(56) References Cited

U.S. PATENT DOCUMENTS

| | | | |
|---|---|---|---|
| 3,775,638 A | 11/1973 | Tidman | |
| 5,394,411 A | 2/1995 | Milchberg et al. | |
| 2004/0135998 A1* | 7/2004 | Chin | 356/318 |

OTHER PUBLICATIONS

J. Yu et al, "Backward supercontinuum emission from a filament generated by ultrashort laser pulses in air." Optics Letters, vol. 26, No. 8, Apr. 15, 2001 , pp. 533-535.*
G. A. Swartzlander. Jr., et al., "Optical Vortex Solitons Observed in Kerr Nonliner Media",1992 The□□American Physical Society, Physical Review Letters, vol. 69, No. 17, pp. 2503-2506, Oct. 26, 1992.*
Braun et al. "Self-channeling of high-peak-power femtosecond laser pulses in air," Jan. 1, 1995; vol. 20, No. 1, Optics letters.*
J. Yu et al, "Backward supercontinuum emission from a filament generated by ultrashod laser pulses in air." Optics Letters, vol. 26, No. 8, Apr. 15, 2001 , pp. 533-535.*
"Optical Vortex Solition Observed in Kerr Nonlinear Media" Physical Review letters, vol. 69, No. 17, Oct. 26, 1992, pp. 2503-2506.*
"Self-channeling of high-peak power femtosecond laser pulses in air" Optics Letters, vol. 20, No. 1, Jan. 1, 1995, pp. 73-75.*
V. Sharka, et al., "Evolution of singular optical pulses towards vortex solitons and filamentation in air," ©2003 Elsevier B. V., Physics Letters, A, vol. 319, pp. 317-324, Dec. 8, 2003.

(Continued)

*Primary Examiner*—Minsun Harvey
*Assistant Examiner*—Tod T. Van Roy
(74) *Attorney, Agent, or Firm*—Blank Rome LLP

(57) ABSTRACT

Optical filaments are formed controllably in a gaseous medium such as air. A phase plate introducing a phase singularity is introduced into the path of the laser beam that forms the optical filaments in the medium. The phase plate is preferably a vortex phase plate having one or more singularities. The locations and characteristics of the phase singularities are selected to control the number and locations of the optical filaments.

22 Claims, 9 Drawing Sheets

OTHER PUBLICATIONS

C. T. Law, et al., "Waveguiding properties of optical vortex solitons," ©2000 Optical Society of America, Optics Letters, vol. 25, No. 1, pp. 55-57, Jan. 1, 2000.

D. Mihalache, et al., "Stable three-dimensional spinning optical solitons supported by competing quadratic and cubic nonlinearities," arXiv:nlin.PS/0206007 v1, Jun. 7, 2002.

M. Mlejnek, et al., "Dynamic spatial replenishment of femtosecond pulses propagating in air," ©1998 Optical Society of America, Optics Letters, vol. 23, No. 5, pp. 382-384, Mar. 1, 1998.

M. Mlejnek, et al., "Optically turbulent femtosecond light guide in air," ©1999 The American Physical Society, Physical Review Letters, vol. 83, No. 15, pp. 2938-2941, Oct. 11, 1999.

J. V. Moloney, et al., "Femtosecond self-guided atmospheric light strings," ©2000 American Institute of Physics, Chaos, vol. 10, No. 3, pp.—559-569, Sep. 2000.

C. Day, "Experiments detail how powerful ultrashort laser pulses propagate through air," Physics Today Reference, p. 22, Jan. 1998.

Z. S. Sacks, et al., "Holographic formation of optical-vortex filaments," ©Optical Society of America, J. Opt. Sc. Am. B., vol. 15, No. 8, pp. 2226-2234, Aug. 1998.

G. A. Swartzlander, Jr., et al., "Optical Vortex Solitons Observed in Kerr Nonliner Media," ©1992 The American Physical Society, Physical Review Letters, vol. 69, No. 17, pp. 2503-2506, Oct. 26, 1992.

Jens Schwartz, et al., "Analytical solution for uv filaments," ©2001 The American Physical Society, Physical Review A, vol. 65, pp. 013806-1-013806-10, Dec. 5, 2001.

P. Sprangle, et al., "Propagation of intense short laser pulses in the atmosphere," ©2002 The American Physical Society, Physical Review E 66, vol. 66, pp. 046418-1-046418-21, Oct. 30, 2002.

S. Tzortzakis, et al., "Breakup and fusion of self-guided femtosecond light pulses in air," ©2001 The American Physical Society, Physical Review Letters, vol. 86, No. 24, pp. 5470-5473, Jun. 11, 2001.

X. Mi. Zhao, et al., "Femtosecond ultraviolet laser pulse induced lightning discharges in gases," ©1995 IEEE, Journal of Quantum Electronics, vol. 31, No. 3, pp. 599-612, Mar. 1995.

S. Tzortzakis et al, "Long connected plasma channels in air produced by ultrashort UV laser pulses," ©1999 Optical Society of America, oral paper, http://pclasim47.univ-lyon1.fr/publications/cleo2000uv.pdf.

J. Yu et al, "Backward supercontinuum emission from a filament generated by ultrashort laser pulses in air," *Optics Letters*, vol. 26, No. 8, Apr. 15, 2001, pp. 533-535.

"Transient Microphotospectrometer," Nov. 7, 2000, http://www.esrf.fr/exp_facilities/ID9/spectro.html.

* cited by examiner

MAP OF SAMPLE 1 REGIONS
(800 nm BURN) 6-10-03 (PBL)

REGIONS DO NOT SHOW EXACT BOUNDARIES, BUAT SHOW WHICH FEATUARES ARE PRESENT WITHIN EACH CLOSE-UP.

GENERATION OF OPTICAL FILAMENTS BY USE OF PHASE PLATE

FIELD OF THE INVENTION

The present invention is directed to the generation of optical filaments and more particularly to spatial control over the generation of optical filaments.

DESCRIPTION OF RELATED ART

An optical filament is a non-diffracting optical beam that can propagate over relatively long distances through a medium that possesses the appropriate nonlinear optical responses. When a beam of intense light passes through such a medium, the medium tries to focus the light. If the beam is focused to a sufficient degree, the intensity becomes extremely high, with the result that the medium starts to ionize. The resulting plasma tends to defocus the beam. A balance between the focusing and defocusing effects results in the optical filament. The threshold power for forming an optical filament is typically in the tens of megawatts.

Normal atmosphere contains such optical nonlinearities, as do many other substances. Optical filaments have applications such as laser-controlled discharges, long-range deposition of high laser intensities, and LIDAR monitoring.

The formation of optical filaments extending over several meters has been reported. However, to date, no reliable method has been developed or disclosed for controlling the formation of one or more optical filaments within a filament forming laser beam. Though the number of filaments could be somewhat controlled by the amount of energy in the beam, the transverse position(s) of filament(s) relative to the beam and the relative positions between multiple filaments could not be controlled. It was generally believed that intensity fluctuations across the beam seeded the formation of filaments in a random manner.

There is general speculation by several experimentalists that diffraction from hard edges in an optical system seeds filament formation. However, controllable filament generation on that basis has not been achieved.

In an entirely different field of endeavor, the use of phase plates for forming optical vortices is well understood. Such optical vortices have been formed using CW and low-power beams. However, the use of a phase plate for controlling ultrafast filamentation has not been recognized.

SUMMARY OF THE INVENTION

It will be readily apparent from the above that a need exists in the art for a way to control the formation of optical filaments.

It is therefore an object of the invention to control the formation of one or more optical filaments within the filament forming laser beam.

It is a further object of the invention to control the locations of the optical filaments.

It is a still further object of the invention to control, in a deterministic manner, the total number of optical filaments generated and their spatial positions of origin.

It is a still further object of the invention to do so without relying solely on the energy of the beam or on intensity fluctuations.

It is a still further object of the invention to provide energenically efficient generation of filaments.

It is a still further object of the invention to generate filaments that are robust to atmospheric turbulence.

To achieve the above and other objects, the present invention is based on the inventors' discovery that filaments are formed from localized optical inhomogeneities, such as optical phase discontinuities and singularities, in the wave front. A phase plate can be generated to place optical phase singularities at specific locations in the beam. This allows the generation of specifically designed patterns of filaments in air or another gaseous medium within a beam.

The laser beam is an intense, pulsed laser beam having a high peak power, typically around five terawatts. The optical phase singularities permit vortex formation and thus a stable mode of propagation.

In the preferred embodiment, a phase plate for generating optical vortices is used to seed the formation of optical filaments at specific locations within an optical beam. The phase plate can be either reflective or trnasmissive and can be inserted in the beam before it is focused or compressed. The phase plate can be constructed by etching the pattern into glass, or any of the other standard methods of generating phase plates. The phase singularities are locations where the induced phase shift on the beam is undefined, and the induced phase shift varies from 0 to an integer multiple of $2\pi$ along a path around the singularity. It is possible to form an array of optical singularities on a phase plate. The induced phase singularities seed the formation of optical filaments in the designed pattern on the phase plate.

A phase plate can be generated to place optical phase singularities at specific locations in the beam. This allows the generation of specifically designed patterns of filaments within a beam.

The characteristics of the filaments can be controlled by controlling the singularity and the phase plate in general, e.g., by controlling the order of the singularity. The selection of the order of the singularity provides control over stability. A phase singularity in the middle of the filament increases the stability of the filament to phase changes in the air or other gaseous medium. Such phase changes can be caused, e.g., by air turbulence. Thus, the filament can be produced in a controlled manner in a plane perpendicular to the direction of propagation, as determined by the phase pattern.

BRIEF DESCRIPTION OF THE DRAWINGS

A preferred embodiment will be disclosed in detail with reference to the drawings, in which.

DETAILED DESCRIPTION OF THE PREFERRED EMBODIMENTS

A preferred embodiment will now be set forth in detail with reference to the drawings.

The preferred embodiment uses a phase plate to impart a phase singularity. The phase plate can be a vortex plate, in which the phase delay increases in a circle around the singularity.

Figure 1:
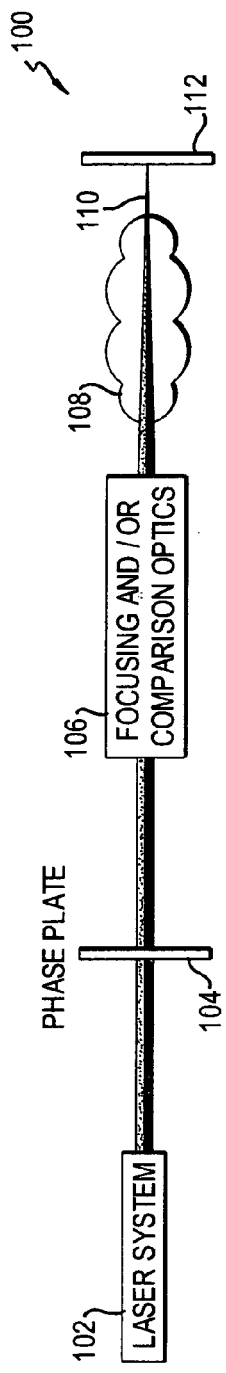
FIG. 1 shows an experimental setup for creating filaments according to the preferred embodiment.

FIG. 1 shows a schematic diagram of an apparatus according to the preferred embodiment. In the apparatus 100, a laser system 102 emits a laser beam L. The laser beam L passes through a phase plate 104, which has a structure to be described below. The phase plate 104 imparts one or more phase singularities onto the laser beam L, which is then focused or compressed using focusing or compression optics 106. The focused or compressed laser beam passes through a medium 108, such as air, having the appropriate nonlinear properties. One or more optical filaments 110 form in the medium 108. The optical filaments 112 form an effect such as a burn on a target 112.

Figure 2:
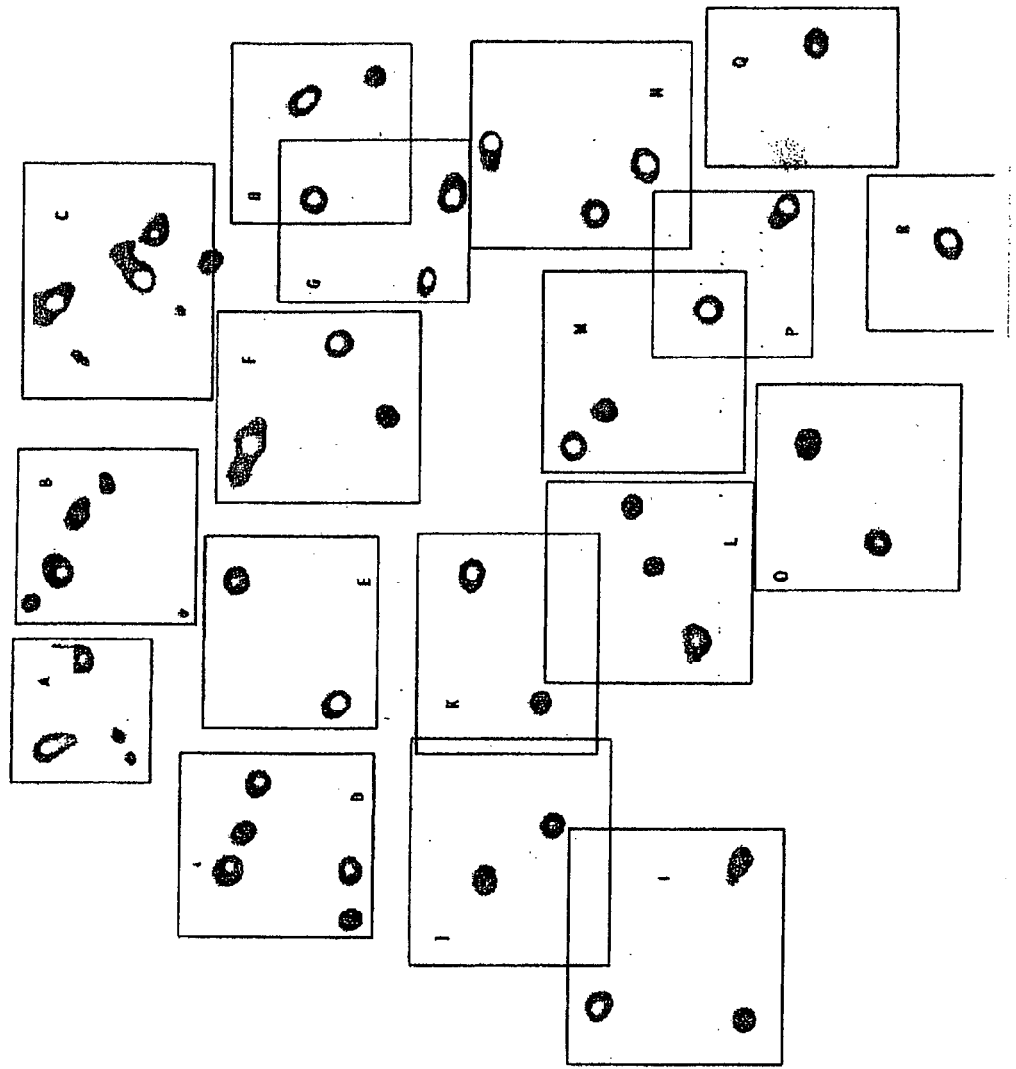
FIGS. 2–4 show the structure of individual filaments from a random distribution of phase singularities.
Figure 3:
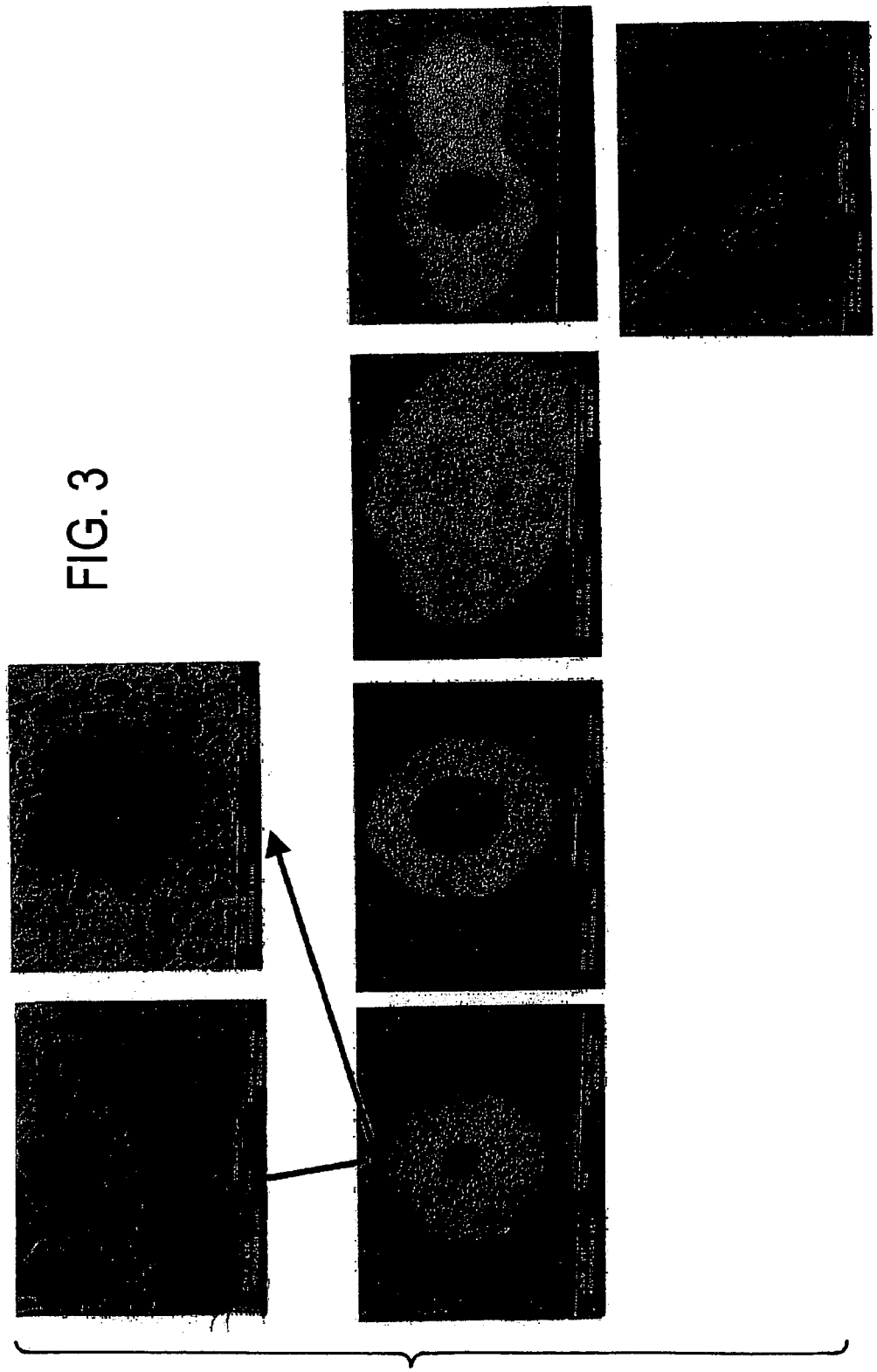
Figure 4:
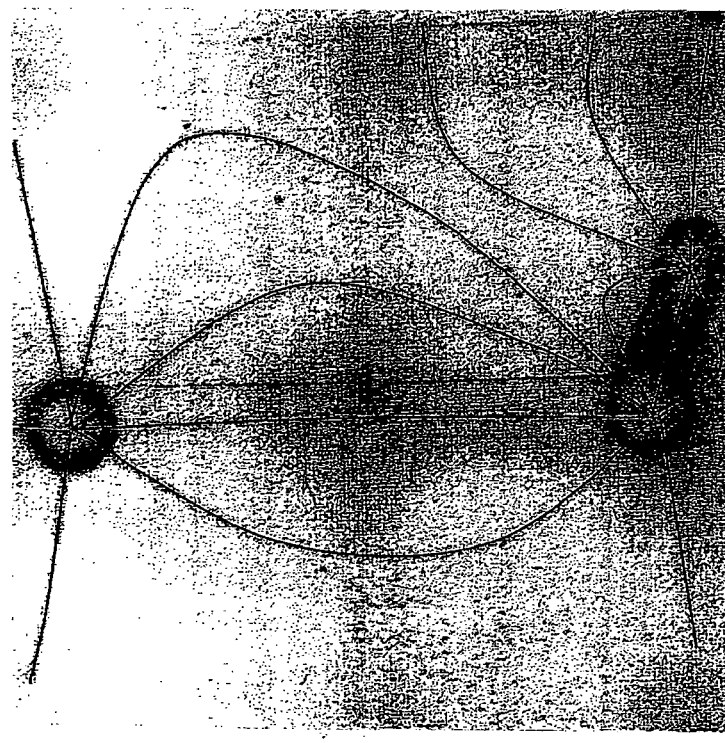

FIGS. 2–4 show the structure of the individual filaments from a random distribution of phase singularities. The structure shown in FIGS. 2–4, combined with the experimental and theoretical phase analysis, demonstrates that phase singularities seed the process of forming vortices that in turn support filaments.

FIG. 2 shows an 800 nm filament burn pattern on Plexiglas. FIG. 3 shows electron microscope scans, which show that the damage is in an annular shape. FIG. 4 shows burns in a "donut mode" that is consistent with phase singularities; possible equal-phase lines are superimposed on the image.

The results shown in FIGS. 2–4 are shown to result from phase singularities for the following reasons.

The burn evidence points to phase singularities. Several burns from filaments show annular structure (400 nm filaments, burn on polycarbonate sheet (e.g., compact disk, or Macrolon™); 800 nm filaments, burns on plexiglass, polycarbonate sheet (e.g., compact disk, or Macrolon™) and tinted plexiglass; 1 ps 800 nm filaments, burns on polycarbonate sheet (e.g., compact disk, or Macrolon™) and plexiglass). Electron microscope images of the burns (FIG. 3) verify that the annular structure is not an optical effect.

Such evidence has probably been missed in the past by other investigators for the following reasons. The burn process in most materials spreads or has too low a threshold to capture the structure of the filament. Plasma plumes off of metals or other materials diffuse so that filament structure cannot be observed. Volumetric damage in materials like glass is difficult to analyze. Diffraction experiments also verify the presence of a phase singularity. Such experiments have been performed for 400 nm and 800 µm filaments.

Figure 5:
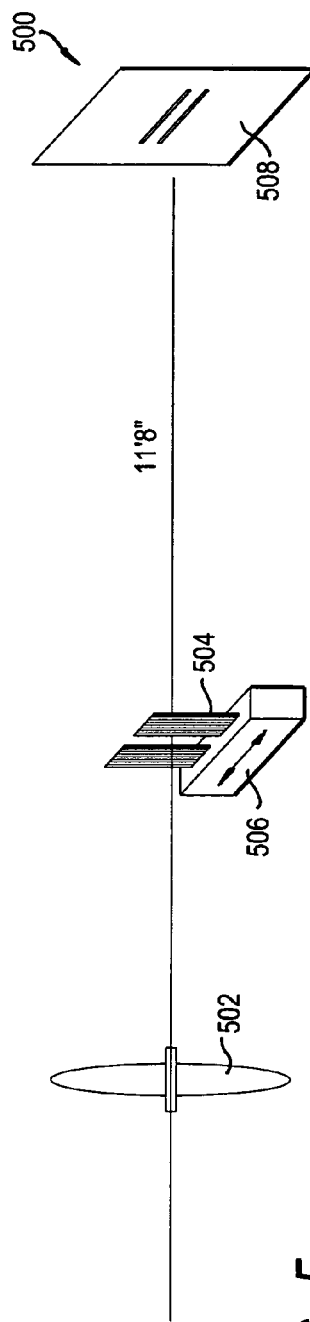
FIG. 5 shows an experimental setup used for verifying the presence of phase singularities in optical filaments in air.

FIG. 5 shows an experimental setup 500 that was used for the diffraction experiments. An aperture 502 singles out one or more filaments or pre-filaments. A slit 504 is provided on a translation stage 506 for scanning across the filament. The central lobe of the diffraction pattern is shown on a screen 508.

Calculations show that if filaments have phase singularities, the diffraction pattern should have two skewed, parallel horizontal lines at the central order, but should only have one if a singularity is not present. It is observed for 400 nm light, that the beam pattern has dark spots, which down the path of the beam, evolve into filaments.

Using the aperture to reduce the number of filaments, the slit was placed to select a filament upstream of where the filament was fully formed. The pre-formed filament was still intense enough to form a plasma plume off of the metal, but had not collapsed to the point to form a plasma plume when hitting paper. The pre-formed filament was not intense enough to get a burn.

The slit was scanned across the filament and the resulting diffraction patterns were photographed.

Figure 6:
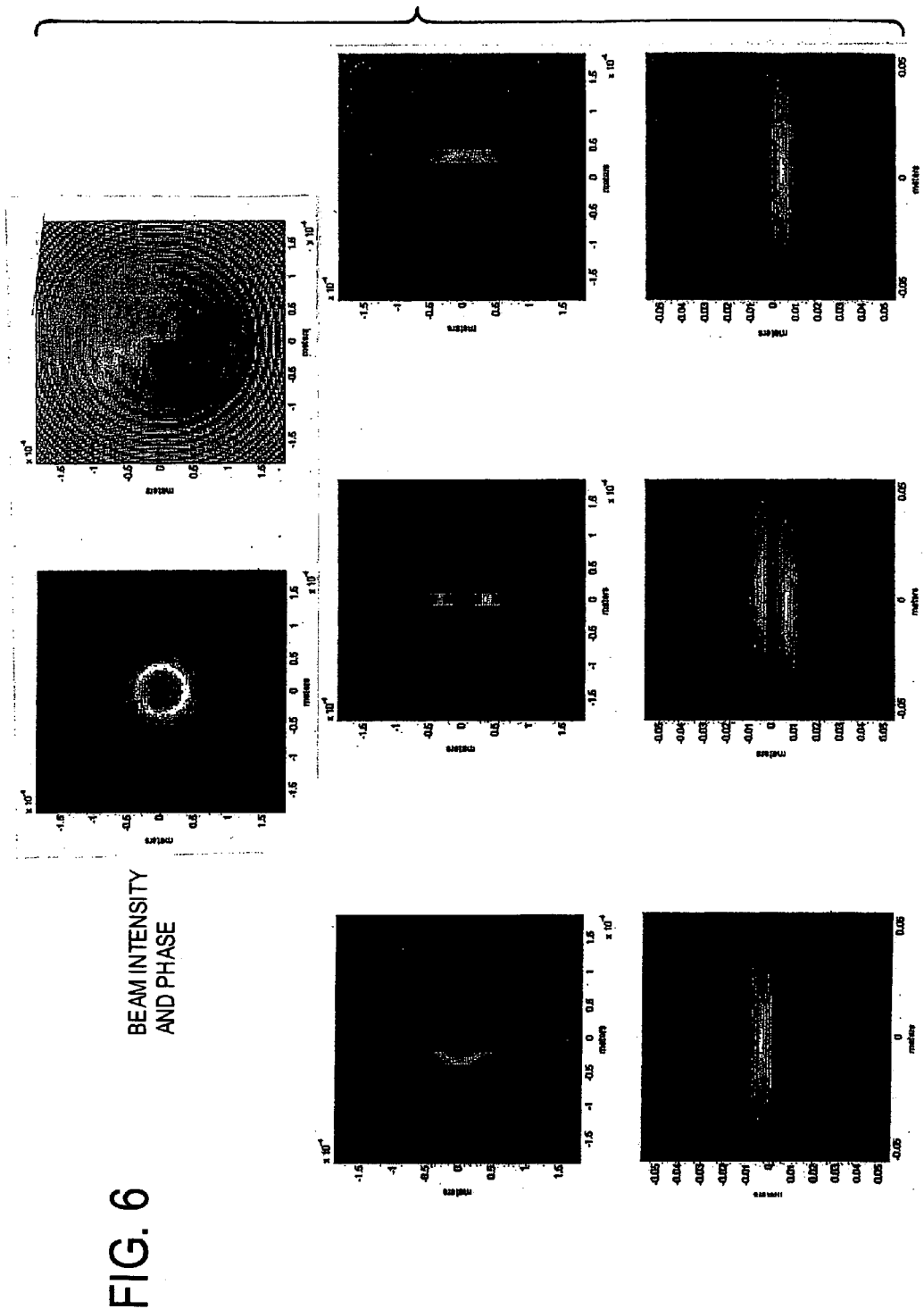
FIGS. 6 and 7 show numerical simulations with and without a phase singularity, respectively.
Figure 7:
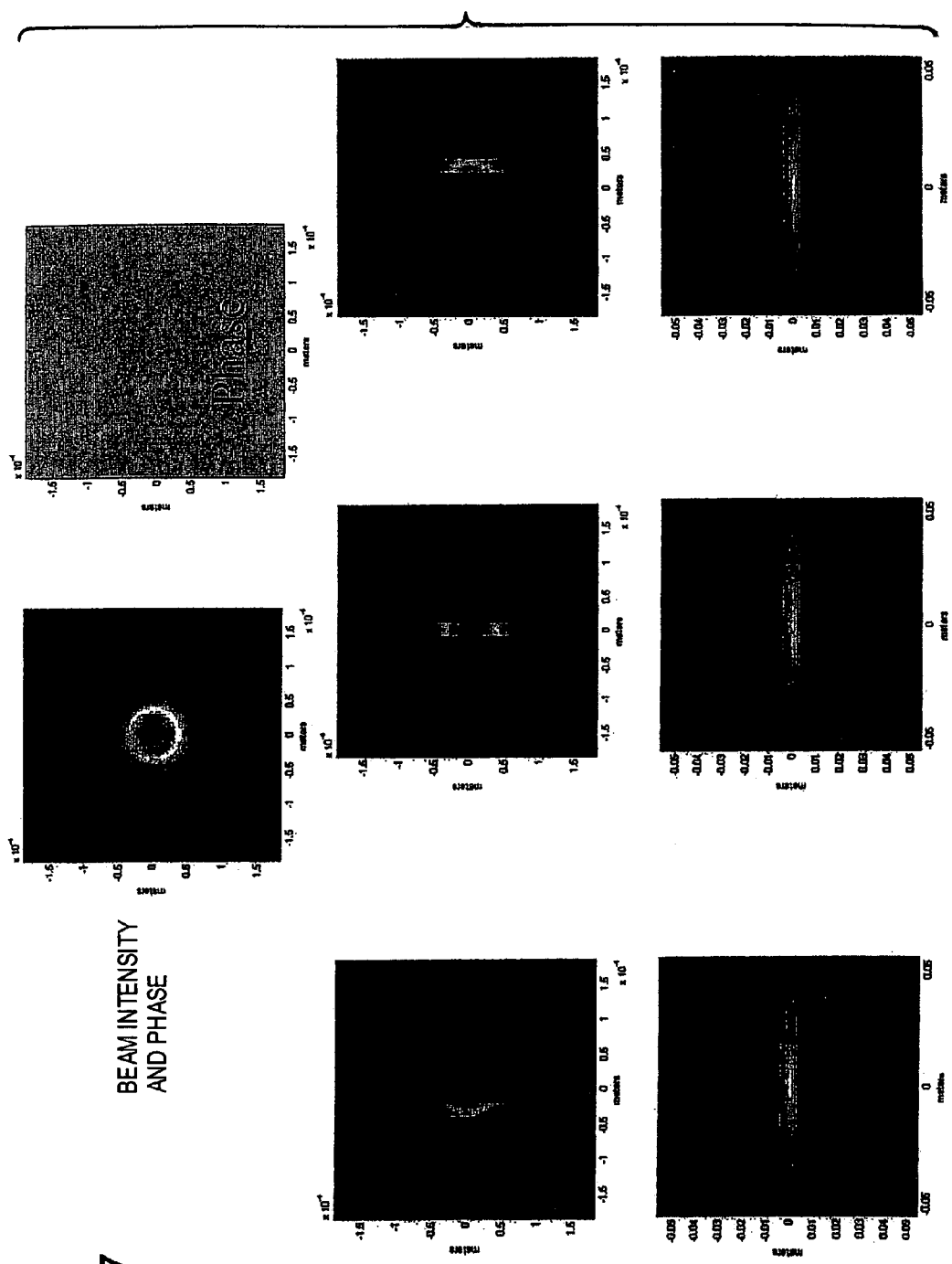
Figure 8:
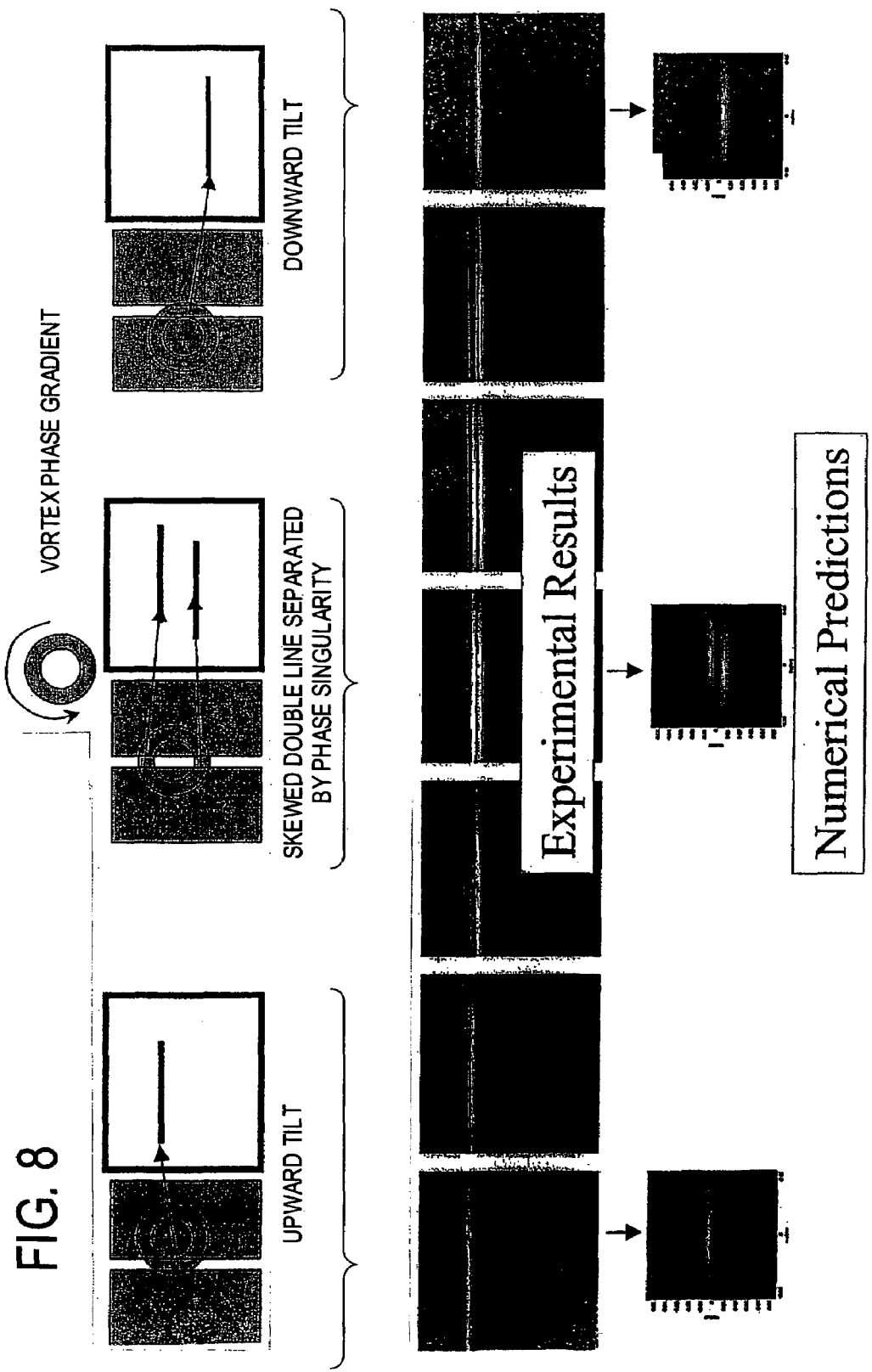
FIG. 8 shows a comparison of experimental results with numerical simulations of diffraction patterns of a filament with a phase singularity.

FIGS. 6 and 7 show numerical simulations with and without a phase singularity, respectively. FIG. 8 compares the experimental results from the 400 nm experiments with the numerical simulations with a singularity and shows the match between the two.

Figure 9:
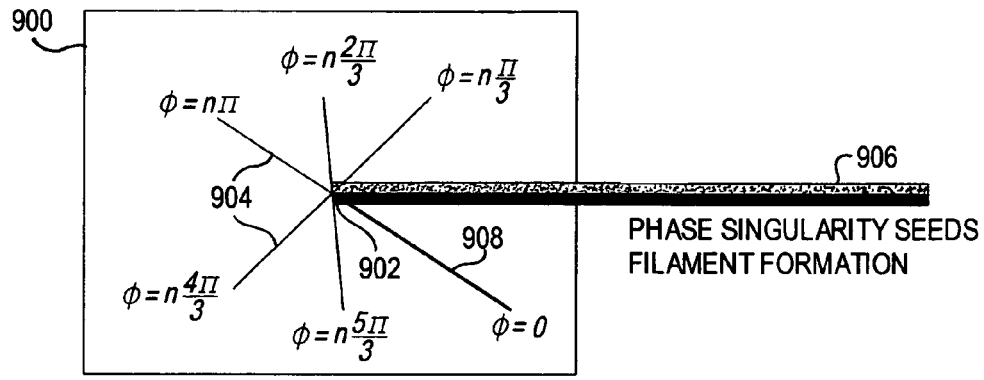

FIG. 9 shows a phase plate 900 that can be used to seed optical filaments. The phase plate 900 shown is an $n^{th}$ order singularity phase plate having a phase singularity 902. The variation in phase around the singularity 902 is indicated in the drawing by lines 904 of equal phase. The singularity 902 seeds the formation of a filament 906. The phase plate 900 is branch cut at phase $\phi=0$ represented by an n*wavelength ledge 908 or a phase discontinuity.

The orders of the singularities can be selected to control filament properties such as size and inner null diameter. Thus, whether the phase plate has a single singularity or multiple singularities, the order or orders of the singularity or singularities can be selected to provide the appropriate control over the filament properties.

Figure 10:
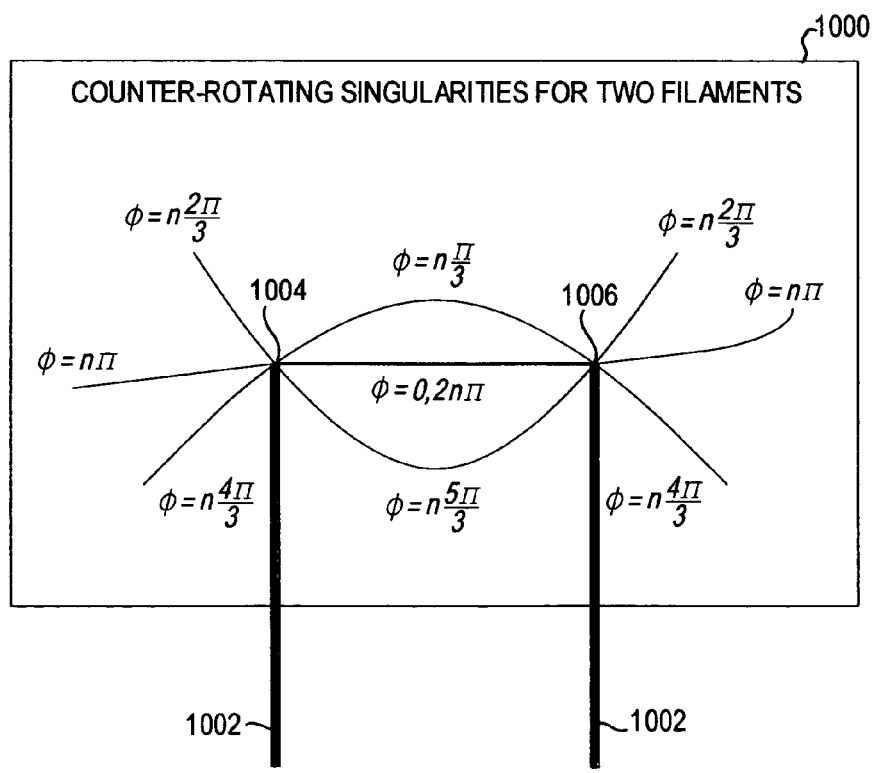
Figure 11:
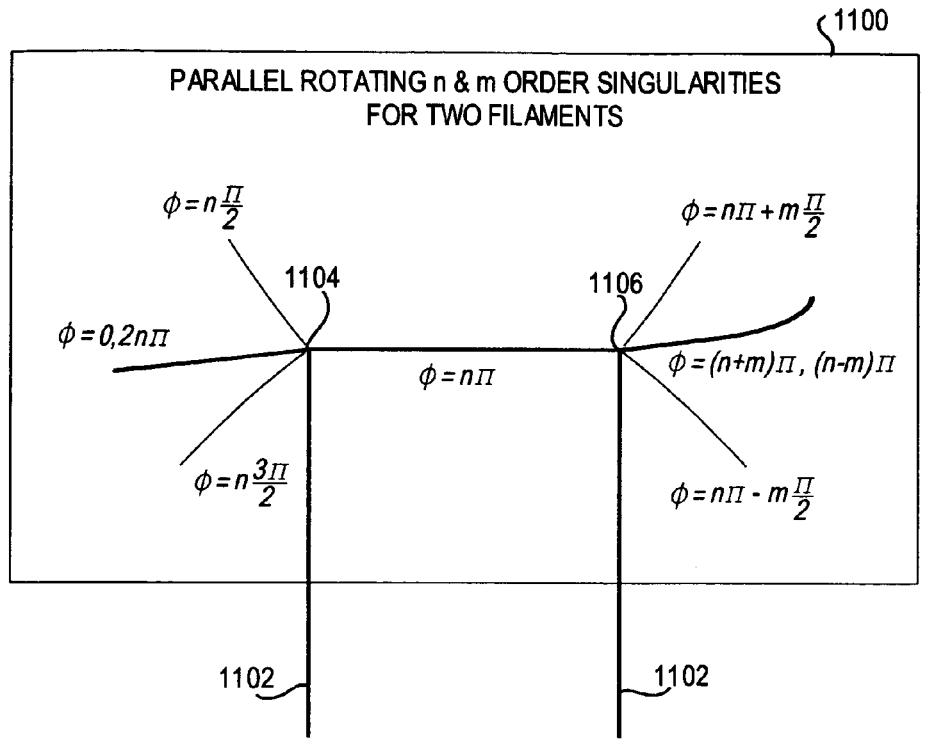

FIGS. 10 and 11 show phase plates 1000, 1100 for seeding two optical filaments 1002 or 1102. The phase plate 1000 of FIG. 10 has counter-rotating singularities 1004, 1006. The phase plate 1100 of FIG. 11 has parallel-rotating singularities 1104, 1106 of orders m and n.

Figure 12:
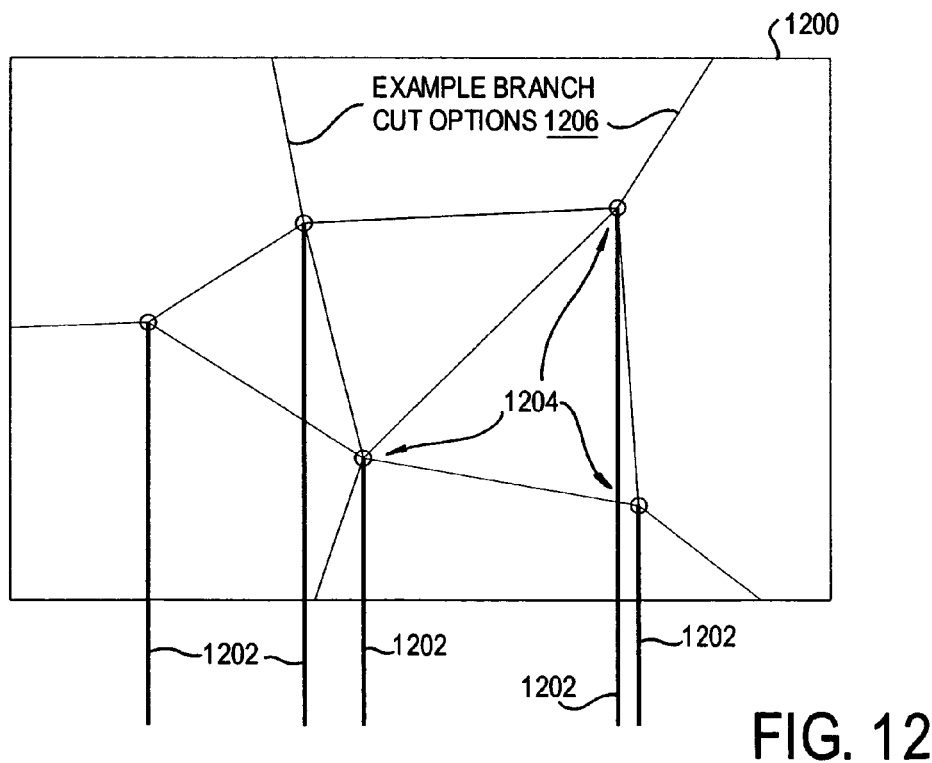

FIG. 12 shows a generalized phase plate 1200 for seeding an arbitrary number of optical filaments 1202 by the use of singularities 1204. The phase plate 1200 of FIG. 12 is a generalization of those of FIGS. 10 and 11. Branch cuts 1206 can be placed in the phase plate to allow any combination or position of multiple singularities of arbitrary sign or order. Generally, only one or no branch cuts are required to extend to the perimeter of the phase plate, though more may be used to distribute the discontinuities. Regular arrays or arbitrary patterns of filaments may be seeded.

Figure 13:
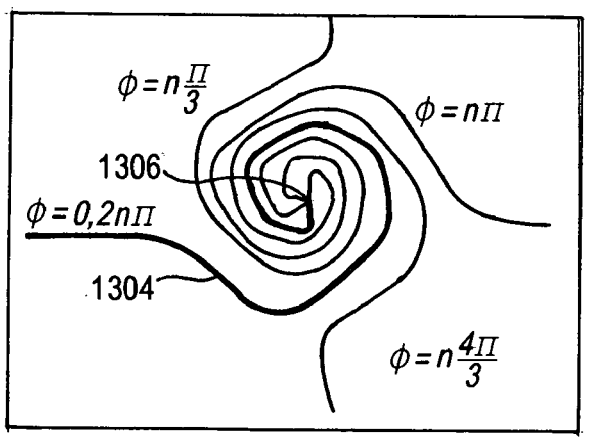
FIGS. 9–13 show phase plates usable in the preferred embodiment.

FIG. 13 shows a phase plate 1300 for producing a focused filament. By spiraling the phase nxwavelength phase discontinuity 1304 around the singularity 1306, focus/defocus can be added to control the filament. By providing focus and additional control in the filament formation, the spiraling phase lines provide an additional degree of control.

Figure 14:
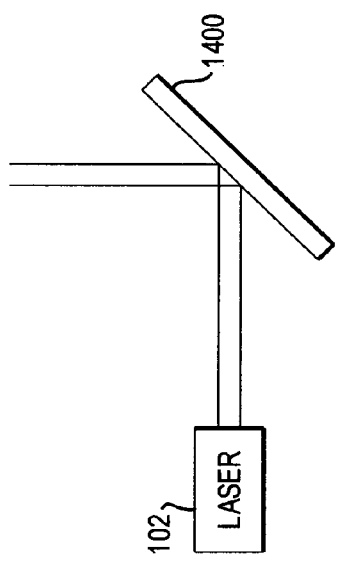
FIG. 14 shows a setup with a reflective phase plate.

The phase plates disclosed above are transmissive. However, as shown in FIG. 14, any of the above phase plates, or any other suitable phase plate, can be implemented as a reflective phase plate 1400. The use of the laser system 102 has been disclosed above; therefore, that disclosure will not be repeated here.

While two preferred embodiments have been set forth above, those skilled in the art who have reviewed the present disclosure will readily appreciate that other embodiments can be realized within the scope of the invention. For example, a phase plate can impart a combination of singularities and discontinuities. Further, a phase singularity or discontinuity can be created in any suitable way, e.g., by varying the index of refraction of the material of the phase plate. Also, a plate can be used to impart other localized optical inhomogeneities. Moreover, numerical values and the like are illustrative rather than limiting. Therefore, the present invention should be construed as limited only by the appended claims.

We claim:

1. A method for forming at least one optical filament in a gaseous medium, the method comprising:

(a) generating a pulsed laser beam having an optical path that takes the pulsed laser beam through the medium;

(b) providing, in the optical path, an optical element having at least one phase singularity such that the at least one phase singularity is in the optical path; and (c) passing the pulsed laser beam through the medium downstream in the optical path from the optical element such that the at least one optical filament is formed in accordance with the at least one phase singularity.

2. The method of claim 1, wherein the optical element comprises a vortex phase plate.

3. The method of claim 2, wherein the vortex phase plate has a plurality of the phase singularities.

4. The method of claim 3, wherein at least two of the singularities are counter-rotating singularities.

5. The method of claim 3, wherein at least two of the singularities are parallel-rotating singularities.

6. The method of claim 5, wherein the parallel-rotating singularities are of different orders.

7. The method of claim 3, wherein the plurality of singularities are formed with at least one branch cut.

8. The method of claim 2, wherein the at least one singularity in the vortex phase plate is formed by spiraling phase lines to focus the at least one optical filament.

9. The method of claim 1, wherein step (b) comprises selecting an order of the at least one phase singularity to control formation of the at least one optical filament.

10. The method of claim 9, wherein the order of the at least one phase singularity is selected to control at least one of a size and an inner null diameter of the at least one optical filament.

11. The method of claim 1, wherein the optical element is transmissive.

12. The method of claim 1, wherein the optical element is reflective.

13. An apparatus for forming at least one optical filament in a gaseous medium, the apparatus comprising:

a laser source for generating a pulsed laser beam having an optical path, the laser source being positionable relative to the medium such that the optical path takes the pulsed laser beam through the medium; and an optical element, disposed in the optical path, having at least one phase singularity such that the at least one phase singularity is in the optical path.

14. The apparatus of claim 13, wherein the optical element comprises a vortex phase plate.

15. The apparatus of claim 14, wherein the vortex phase plate has a plurality of the phase singularities.

16. The apparatus of claim 15, wherein at least two of the singularities are counter-rotating singularities.

17. The apparatus of claim 15, wherein at least two of the singularities are parallel-rotating singularities.

18. The apparatus of claim 17, wherein the parallel-rotating singularities are of different orders.

19. The apparatus of claim 15, wherein the plurality of singularities are formed with at least one branch cut.

20. The apparatus of claim 14, wherein the at least one singularity in the vortex phase plate is formed by spiraling phase lines to focus the at least one optical filament.

21. The apparatus of claim 13, wherein the optical element is transmissive.

22. The apparatus of claim 13, wherein the optical element is reflective.

* * * * *